United States Patent [19]

Putney

[11] 4,148,666
[45] Apr. 10, 1979

[54] CRYSTALLINE NICKEL CHELATE OF 1-NITROSO-2-NAPHTHOL AND PROCESS FOR PRODUCING SAME

[75] Inventor: Richard K. Putney, Hudson Falls, N.Y.

[73] Assignee: Hercules Incorporated, Wilmington, Del.

[21] Appl. No.: 853,929

[22] Filed: Nov. 22, 1977

[51] Int. Cl.² .............................................. C04B 31/00
[52] U.S. Cl. ............................ 106/288 Q; 260/439 R
[58] Field of Search ................ 260/439 R; 106/288 Q

[56] References Cited

U.S. PATENT DOCUMENTS

| | | | |
|---|---|---|---|
| 2,178,809 | 11/1939 | Rosenblatt | 260/439 R X |
| 2,259,641 | 10/1941 | Horning | 260/439 R |
| 2,726,920 | 12/1955 | Federkiel | 260/439 R X |
| 3,338,937 | 8/1967 | Inman | 260/439 R |
| 3,338,938 | 8/1967 | Matlack | 260/439 R |
| 3,751,439 | 8/1973 | Putney | 260/439 R |

*Primary Examiner*—Helen M. S. Sneed
*Attorney, Agent, or Firm*—Hazel L. Deming

[57] ABSTRACT

Pigmentary compositions consisting essentially of a crystalline, light-stable nickel chelate of 1-nitroso-2-naphthol and from about 0.15 to about 2 parts per part of the anhydrous nickel chelate of certain fatty acids and/or their salts are described. The compositions are produced by treating the hydrated nickel chelate of 1-nitroso-2-naphthol in aqueous medium at a pH of about 3.5 to about 5 with the fatty acid and/or its salt, isolating the treated chelate and then heating the isolated product at about 75° to about 115° C. until dehydration is complete and the chelate is converted to its crystalline, light-stable form.

10 Claims, No Drawings

CRYSTALLINE NICKEL CHELATE OF 1-NITROSO-2-NAPHTHOL AND PROCESS FOR PRODUCING SAME

This invention relates to a process for producing a crystalline, light-stable nickel chelate of 1-nitroso-2-naphthol and to the crystalline, light-stable nickel chelate composition so produced.

Crystalline, light-stable nickel chelates of 1-nitroso-2-naphthol having an X-ray diffraction pattern characterized by strongest interplanar spacings, referred to as d-spacings, at about 11.6, 9.6, 6.0, 4.9, 4.5 and 3.6 Angstroms are known to the art and are shown by C. G. Inman in U.S. Pat. No. 3,338,937, by A. S. Matlack in U.S. Pat. No. 3,338,938, and by R. K. Putney in U.S. Pat. No. 3,751,439. In the Inman patent the crystalline nickel chelate is produced by forming a nickel salt of 1-nitroso-2-naphthol in aqueous medium, recovering and drying the product and then heating the dried product at above about 120° C. until it is converted to the crystalline, light-stable form of the nickel chelate. In the Matlack patent the crystalline nickel chelate is produced by reacting a nickel compound with a solution of 1-nitroso-2-naphthol in an inert liquid organic diluent which is a solvent for 1-nitroso-2-naphthol and is essentially a nonsolvent for the nickel chelate, recovering the product from the diluent and then treating the product with an electron donor solvent which is at least a partial solvent for the product at a temperature of at least about 50° C. until the crystalline, light-stable nickel chelate is formed. In the Putney patent the crystalline, light-stable nickel chelate of 1-nitroso-2-naphthol is produced by treating a hydrated nickel chelate of 1-nitroso-2-naphthol in aqueous medium with about 0.10 to about 1.0 mole per mole of chelate of certain poly(vinyl chloride) ester plasticizers and then heating the treated chelate at about 65° C. to about 105° C. until the crystalline, light-stable nickel chelate is formed. The crystalline, light-stable nickel chelates of 1-nitroso-2-naphthol produced by the above processes are suitable for use as pigments in numerous applications but have particular value as pigments in enamel and vinyl lacquer formulations where milling can be used to achieve satisfactory color development.

Iron complexes or chelates of 1-nitroso-2-naphthol are also known and are conventionally prepared by the action of an iron salt upon 1-nitroso-2-naphthol or its bisulfite addition compound. The iron chelates are strongly colored compounds which have good light stability and pigmentary properties. The nickel chelates of 1-nitroso-2-naphthol produced in the same manner as the iron chelates, however, have very poor light stability and require a heat treatment under certain conditions to convert the hydrated chelate to a crystalline form which is light stable for successful use as pigments.

In the past, a wide variety of end treatments have been proposed to improve the texture of pigments generally and some of these treatments have been disclosed for use with the iron complexes of 1-nitroso-2-naphthol. For example, MacQueen, in U.S. Pat. No. 1,993,971, teaches that multimetal complexes of 1-nitroso-2-naphthol prepared by the action of a color-forming metal salt and a salt of a second metal from Group II or III of the period table on the bisulfite compound of 1-nitroso-2-naphthol form brighter colored pigments than are obtained using the color forming metal alone, and that when the complexes are formed in the presence of wetting agents which form waterinsoluble compounds with the second metal, the finished pigments have a soft texture and good dispersibility characteristics. Similarly, the alkaline earth metal and heavy metal salts of straight chain fatty acids or rosin acids, colorless organic amines such as aniline, laurylamine or pyridine, water-immiscible saturated or unsaturated aliphatic alcohols, fatty oils or mineral oil, or a mixture of a Group II or III metal resinate and an N-substituted ammonium resinate are said to improve the texture of the iron complexes of 1-nitroso-2-naphthol. See U.S. Pat. Nos. 2,092,750; 2,259,641; 2,454,453; and 3,375,123. Many of the prior art end treatments, however, cannot be used with the hydrated nickel chelate particles since they actually interfere with or prevent the conversion of the chelate to its crystalline, light-stable form, and many other treatments, even though they may not actually prevent conversion to the desired crystalline, light-stable form to the exclusion of at least two other undesirable forms, result in an increase in the particle size and/or agglomeration, with subsequent loss of strength and considerable detraction of the attractiveness of the chelates as pigments.

Now in accordance with this invention, it has been found that a crystalline, light-stable form of the nickel chelate of 1-nitroso-2-naphthol can also be produced by treating a hydrated nickel chelate of 1-nitroso-2-naphthol in aqueous medium with certain fatty acids and/or their salts and then dehydrating the chelate, and that the chelate compositions so produced have a softer texture and are more easily dispersed than the chelates produced by either of the above mentioned Inman or Matlack processes and additionally have at least as good, if not superior, light-fastness properties as compared with the chelates produced by the Inman, Matlack or Putney processes.

Accordingly, the present invention is directed to a process for producing a crystalline, light-stable nickel chelate of 1-nitroso-2-naphthol characterized by having an X-ray diffraction pattern which exhibits strongest d-spacings at about 11.6, 9.6, 6.0, 4.9, 4.5 and 3.6 Angstroms, which process comprises intimately contacting particles of a hydrated nickel chelate of 1-nitroso-2naphthol in aqueous medium at a pH of about 3.5 to about 5.0 with from about 0.15 to about 2 parts per part by weight of the anhydrous nickel chelate of at least one fatty acid containing at least 12 carbon atoms or a water-insoluble, normally solid salt thereof at a temperature at which the acid or its salt is a liquid, isolating the resulting product from the aqueous medium, and then heating the isolated product at a temperature ranging from about 75° C. to about 115° C. until the product is dehydrated and converted to the anhydrous, crystalline, light-stable form of the nickel chelate; and to the novel compositions so produced.

The hydrated chelate which is treated in accordance with the process of the invention can be an aqueous dispersion of the precipitated nickel chelate in the aqueous reaction medium in which the chelate is formed, can be a water-wet presscake of the precipitated chelate or, if desired, can be a washed and dried chelate which has been rewetted with water. Preferably, the hydrated chelate which is treated in aqueous medium is an aqueous suspension of the nickel chelate in the reaction medium in which it has been precipitated. Such hydrated chelates can be prepared in aqueous medium in various ways. For example, in one preferred procedure, the hydrated nickel chelate of 1-nitroso-2-naphthol is formed by nitrosating an aqueous slurry of beta-naphthol with an aqueous solution of sodium nitrite at about 40° C. in the presence of mineral acids and the nickel compound, the acid being fed slowly to an alkaline solution of the beta-naphthol to adjust the pH to about 4.0 to 4.5 and, after nitrosation is completed, increasing the temperature of the aqueous reaction medium to about 95° to 97° C. to complete chelation. Alternatively, in this procedure the nickel compound can be added to the aqueous medium after nitrosation is completed rather than prior to nitrosation. This procedure has the advantage of enabling nitrosation and chelation to be carried out in a single process step. Although the nickel compound can be added to the reaction medium at any time, i.e., before, during or after nitrosation, the nickel compound is preferably introduced after sufficient acid has been added to reduce the pH below about 6. The chelation takes place readily at room temperature or below but is ideally conducted at from room temperature up to the boiling point of the medium.

The 1-nitroso-2-naphthol used for the reaction with the nickel salt can be prepared by any of the methods given in the literature for nitrosating beta-naphthol, as, for example, according to the preparations given in Beilstein's Handbuch der Organischen Chemie, 4th Ed. 7, 712 (1925), 1st Supplement, 385 (1931), 2nd Supplement, 647 (1948), Verlag von Julius Springer, Berlin, or by Marvel and Porter, Organic Syntheses, 2, 61 (1922) or by the procedure of U.S. Pat. No. 3,051,750 to Dettwyler (1962).

The amount of nickel compound used in the formation of the chelate should be sufficient to complex all of the nitroso naphthol, and provide a slight excess. Usually the excess of the nickel compound will not exceed the ratio of about 1.2 atoms of nickel per 2 molecules of 1-nitroso-2-naphthol.

Any nickel compound which is reactive with 1-nitroso-2-naphthol in aqueous medium can be used to produce the hydrated nickel chelate, and the nickel compound can be added to the reaction medium as a solid or as an aqueous solution. Preferred nickel compounds include such nickel salts as the sulfate, nitrate, bromide, chloride, acetate, formate and the propionate of nickel.

In accordance with this invention, particles of the hydrated nickel chelate of 1-nitroso-2-naphthol are treated in aqueous medium with from about 0.15 to about 2 parts per part of anhydrous nickel chelate of at least one fatty acid containing at least 12 carbon atoms or at least one water-insoluble, normally solid salt of a fatty acid containing at least 12 carbon atoms or a mixture of one or more of said fatty acids with one or more of said salts at a temperature at which the acid and/or salt is a liquid until the particles are coated. The fatty acid, its salts or mixtures thereof can be added as such to the aqueous medium or, if desired, the salt can be formed in situ therein by adding the salt forming components to the aqueous medium separately or by including one or both of the components of the salt as ingredients during the formation of the nickel chelate. The fatty acids which are particularly useful in this invention are the saturated aliphatic monocarboxylic acids containing 12 to 24 carbon atoms and most preferably 16 to 20 carbon atoms and having a melting point range from about 40° to about 90° C. Typical of the preferred fatty acids are lauric, myristic, palmitic, stearic, arachidic and benenic acid. The salts of the above fatty acids can be inorganic or organic but should be water-insoluble under conditions of use. The preferred salts are the Group IIA, IIB, IIIA and VIII metal salts, amine salts or quaternary ammonium salts. Most preferred are the nickel, zinc, aluminum or amine salts containing at least two fatty acid moieties per salt molecule, or the monoamine salts or quaternary ammonium salts containing one fatty acid moiety and at least one long chain alkyl substituent on the nitrogen atom. The amines which form water-insoluble, normally solid organic salts with the above fatty acids are preferably aliphatic amines containing primary or secondary amine groups and at least 12 carbon atoms, or alicyclic diamines such as piperazine. Particularly useful are the aliphatic secondary amines containing a long chain alkyl substituent on a nitrogen atom and preferably a 10 to 18 carbon atom alkyl substituent. Typical amines of the above types include decylamine, cetylamine, coconut oil fatty amine, stearylamine, N-dodecyl-N-methylamine, N-stearyl-N,N-dimethyl-amine, N-stearyl-propylenediamine, piperazine and commercial amines such as N-tallow trimethylenediamine available as Duomeen T from Armour Industrial Chemical Company and the long-chain fatty acid ester containing multiple etheramine linkages such as, for example, Sotex NC available from Synthetic Chemicals Inc., and the like. The quaternary ammonium salts which form water-insoluble, normally solid salts with the above fatty acids are preferably quaternary monoalkyl ammonium salts wherein the alkyl substituent contains from 10 to 18 carbon atoms. Particularly preferred are lauryl pyridinium chloride and distearyl dimethylammonium chloride.

As stated, the fatty acid or its salt can be used alone, as a mixture of different fatty acids or different salts or as a mixture of at least one fatty acid with one or more fatty acid salts. Mixtures can be preformed and added as such or can be formed in situ by adding appropriate amounts of the desired salt forming components, acids or water-soluble salts of acids to the aqueous reaction medium prior to, during or following formation of the nickel chelate.

Treatment of the particles in aqueous medium can be carried out in any convenient manner for contacting a solid with a liquid. Usually the treatment is carried out at a temperature which is at least about 10° C. above the melting point of the fatty acid and/or salt in water but is below about 75° C. As stated, the amount of fatty acid and/or its salt will range from about 0.15 to about 2 parts per part of the chelate. Amounts above about 2 parts have not been found to offer additional advantages and, since they dilute the strength of the product, are economically disadvantageous. Preferably, when the fatty acid compound is a salt or mixture of salts, the amount will range from about 0.15 to about 1 part, and most preferably from about 0.20 to about 0.75 part per part of the chelate, and when the fatty acid compound is an acid or mixture of acids, the amount will range from about 0.20 to about 1 part, and most preferably from about 0.3 to about 0.75 part per part of the chelate. The treatment is preferably carried out by stirring or milling an aqueous slurry of the pigment and the fatty acid and/or a salt thereof in water at a temperature ranging from about 45° to about 75° C. for from about 2 to about 40 hours. The amount of water present during the treatment is largely a matter of choice but should be sufficient to provide a fluidity to the mixture and permit effective contact of the nickel chelate particles and the fatty acid and/or salt. Water-miscible organic solvents such as, for example, alcohols, pyridine, dimethylformamide and the like, however, should not be present at this stage since it has been found that their presence tends to enlarge the particles and to interfere with the conversion of the hydrated chelate to its crystalline, light-stable form. Usually, the chelate content of the mixture will be from about 2 to about 8% by weight.

The treated product is next isolated from the aqueous medium. This can be accomplished in any known manner for separating a solid from a liquid, such as by decantation, filtration or centrifugation.

In accordance with this invention, the isolated product is heated at a temperature of from about 75° C. to about 115° C. until dehydration is complete and the product is converted to the anhydrous, crystalline, light-stable form of the nickel chelate. The time required to dehydrate and convert the product to its crystalline, light-stable form will vary, of course, depending upon the manner and conditions of heating with longer times being required at the lower temperatures. Preferably, the heating is carried out at from about 80° to about 100° C. for a period of time up to about 48 hours, and more preferably at from about 84° to about 95° C.

The products of this invention are compositions which contain the anhydrous, crystalline, light-stable nickel chelate of 1-nitroso-2-naphthol and per part of chelate from about 0.15 to about 2 parts, and preferably from about 0.15 to about 1 part, of at least one fatty acid containing at least 12 carbon atoms, or a water-insoluble, normally solid salt thereof. The nickel chelate of 1-nitroso-2-naphthol is believed to contain two molecules of 1-nitroso-2-naphthol per atom of nickel and to have the probable structure illustrated by the following formulae:

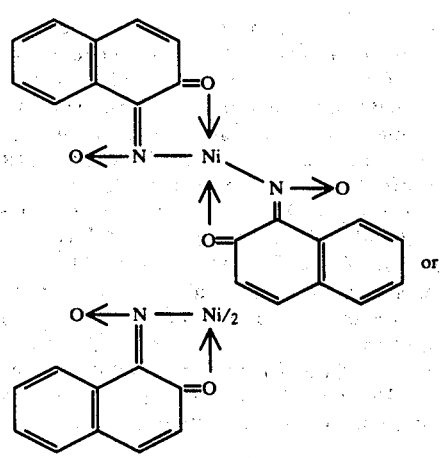

and the crystalline, light-stable form of the nickel chelate is characterized by an X-ray diffraction pattern which exhibits strongest d-spacings at about 11.6, 9.6, 6.0, 4.9, 4.5 and 3.6 Angstroms. The compositions of this invention exhibit the X-ray diffraction pattern of the crystalline, light-stable form of the nickel chelate of 1-nitroso-2-naphthol, are brown solids decomposing above 300° C., and are insoluble or only slightly soluble in water and most of the common organic solvents. In addition to exhibiting excellent light-fastness, the compositions possess high transparency, good tinctorial strength, good stability to dilute acids and alkalies, good heat stability, and excellent bleed resistance in nonpolar solvents, and are of a soft texture and easily dispersed in nitrocellulose lacquers. They are of value as pigments in numerous applications but have particular value as pigments in lacquers applied to metallic substrates, or as pigments for plastics where they exhibit excellent light-fastness.

The invention will be illustrated by reference to the following examples in which all parts and percentages are by weight unless otherwise specified.

EXAMPLE 1

A solution of 29.5 grams (0.205 mole) of beta-naphthol dissolved in 8.2 grams of sodium hydroxide in 100 grams of water at 80° C. was stirred into 700 grams of water containing 6.6 grams of sodium acetate and 1.4 grams of the sodium salt of condensed naphthalene sulfonic acid as dispersing agent. The solution was diluted with water to 1100 milliliters at 40° C., after which a solution of 12.55 grams of sulfuric acid in 244 grams of water was added slowly and uniformly with stirring over a period of 50 minutes to give an aqueous dispersion of finely reprecipitated beta-naphthol at a pH of about 4.0 to 4.5.

A solution of 27.5 grams (0.105 mole) of nickel sulfate hexahydrate, $NiSO_4.6H_2O$, in 100 grams of water was added as rapidly as possible to the above dispersion with stirring and the mixture was maintained at 40° C. with continued agitation while 14.9 grams (0.216 mole) of sodium nitrite in 300 grams of water was uniformly introduced in 2 equal portions, the first portion being added over 6 minutes and the second portion over the next 60 minutes. The resulting brown slurry was next heated to 95°-97° C. at the rate of 1° C. per minute and stirred for an additional hour at that temperature after which the slurry was cooled to 60° C. by dilution with cold water.

Next 21.4 grams of powdered zinc stearate (equivalent to 0.52 part per part of anhydrous nickel chelate) were added to the slurry and the slurry was agitated at 50°-60° C. at a pH of 4.6 to 4.75 for four hours. The slurry was then filtered to remove the solids, the solids were washed free of water-soluble salts and the washed solids were dried for 48 hours at 82° C. in a hot-air tray dryer oven. The dried product was 62.6 grams of a reddish-brown pigmentary material which was easily crushed to a soft fine powder by hammer-milling through a 1/16' screen. On the basis of an analysis for nickel (9.45%), the product contained approximately 65% of the nickel chelate of 1-nitroso-2-naphthol and, by difference, 35% of zinc stearate.

The X-ray diffraction pattern for the product of this example and the patterns for the pigments of Example 1 of the aforesaid Inman, Matlack and Putney patents and for pure zinc stearate were obtained and are reported below.

| | Percent Intensity Relative to the Strongest Line | | | | |
|---|---|---|---|---|---|
| $dA^{(1)}$ | Product of this Example | Inman Pigment | Matlack Pigment | Putney Pigment | Zinc Stearate |
| 13.8 | 100 | — | — | — | 100 |
| 11.7 | — | 100 | — | 100 | — |
| 11.6 | 100 | — | — | — | — |
| 11.5 | — | — | 100 | — | — |
| 9.7 | — | 38 | — | — | — |
| 9.6 | 42 | — | — | 44 | — |
| 9.5 | — | — | 42 | — | — |
| 8.3 | 30 | — | — | — | 50 |
| 6.9 | 11 | 5 | 4 | 10 | 17 |
| 6.5 | 9 | 4 | — | — | — |
| 6.4 | — | — | 4 | — | — |
| 6.0 | 44 | 30 | 31 | 44 | 20 |

-continued

| | Percent Intensity Relative to the Strongest Line | | | | |
|---|---|---|---|---|---|
| dA[1] | Product of this Example | Inman Pigment | Matlack Pigment | Putney Pigment | Zinc Stearate |
| 5.2 | 9 | — | — | — | 7 |
| 4.9 | 29 | 17 | 27 | 39 | — |
| 4.6 | — | — | — | 32 | — |
| 4.5 | 54 | 18 | 24 | — | 31 |
| 4.4 | 5[2] | — | — | — | 33 |
| 4.2 | 30 | 11 | — | 18 | 27 |
| 4.1 | 20 | — | 15 | — | 27 |
| 3.9 | 76 | — | 5 | — | 85 |
| 3.6 | 6 | 23 | 42 | 48 | 20 |
| 3.5 | 18 | 9 | — | 20 | — |
| 3.4 | — | — | 7 | — | 13 |

[1] interplanar spacings expressed in Angstrom units
[2] unresolved shoulder

A comparison of the above patterns confirmed that the pigmentary product of this example contained the crystalline, light-stable nickel chelate of the Inman, Matlack and Putney patents, but also contained zinc stearate.

Light-fastness of the pigmentary product of this example and the pigment prepared according to Example 1 of the aforesaid Putney patent U.S. 3,751,439 except that the amount of dioctylphthalate was increased to 21.4 grams (product contained 65% of the nickel chelate and 35% of dioctylphthalate) were compared on paper drawouts and exposed for 250 hours in a Fadeometer. The inks for these drawouts were prepared by mulling the pigments in 1 Litho varnish and then reducing the resulting dispersions with zinc white paste, the same pigment-to-vehicle ratio and the same reduction being employed for each. Both pigments showed slight fading and exhibited excellent light-fastness, the degree of fading being slightly less for the pigmentary product of this example.

EXAMPLES 2–6

In these examples, the procedure set forth in paragraphs 1 and 2 of Example 1 was followed up to the point of addition of cooling water, at which time various amounts of dry powdered stearic acid were added, stirring was continued for 5 minutes and the slurry was cooled to 60° C. by dilution with cold water. Next a sufficient amount of a salt-forming component in 150 grams of water was added to the slurry uniformly over a one hour period to provide 0.5 part (Examples 2–5) or 0.3 part (Example 6) of stearic acid salt per part of anhydrous nickel chelate, the pH was adjusted to 4.0–4.5 with sodium hydroxide and the slurry was agitated at 50° to 60° C. for ½ hour, the slurry was filtered and the product was recovered as in Example 1. Details of the ingredients used and the products obtained for each of these examples are shown in Table I below.

Table I

| Ex. No. | Stearic Acid (grams) | Salt-forming Component Identity | Salt-forming Component Amount (grams) | Pigmentary Product Amount (grams) | Pigmentary Product Nickel Analysis (%) | Pigmentary Product Nickel Chelate (%) |
|---|---|---|---|---|---|---|
| 2 | 19.4 | ZnSO$_4$ | 6.2 | 60.9 | 9.27 | 64 |
| 3 | 20.5 | Al$_2$(SO$_4$)$_3$·16 H$_2$O | 7.1 | 61.3 | 9.00 | 62 |
| 4 | 18.8 | piperazine | 2.9 | 59.7 | — | 67[a] |
| 5 | 19.4 | NiSO$_4$·6H$_2$O | 9.6 | 60.4 | 12.25 | 67[a] |
| 6 | 10.8 | lauryl pyridinium chloride | 10.8 | 52.3 | — | 77[a] |

[a] Estimated on the basis of theoretical nickel chelate formation.

The X-ray diffraction patterns for the products of these examples confirmed the presence of the anhydrous crystalline form of the nickel chelate of 1-nitroso-2-naphthol. When the products were tested on paper drawouts in a Fadeometer for 250 hours in accordance with the procedure of Example 1, the light-fastness was comparable to that of the pigment composition of Example 1.

A comparison of the film properties and light-fastness obtained with nitrocellulose inks containing the product of Example 6 and the pigmentary product of Example 1 of the aforesaid Putney patent showed that the product of Example 6 produced on shellac-coated aluminum foil a colored film of higher gloss and clarity, with slightly less fade after 270 hours in a Weather-Ometer. The inks for this test were prepared by ball milling the following ingredients for 48 hours in a pint can at ambient temperature and then thinning 100 grams of the resulting ink with 40 milliliters of a mixed ethylacetate/n-butylacetate/n-butanol solvent (1:1:1, by volume):

1000 grams of ⅜' steel balls
6.1 grams of pigment (100% toner)
7.8 grams of dioctyl phthalate[1]
31.6 grams of Rs 1/2 sec. nitrocellulose containing 30% ethanol
16.0 grams of n-butanol
17.5 grams of ethyl acetate
17.4 grams of n-butyl acetate
50.2 grams of toluene (1) Total amount; in the case of the Putney control pigment the amount of dioctyl phthalate was reduced by the amount of dioctyl phthalate present in the pigment.

EXAMPLE 7

The procedure of Example 1 was repeated except that 3.3 grams of N-tallow trimethylenediamine were substituted for the 1.4 grams of the sodium salt of condensed naphthalene sulfonic acid, the beta-naphthol reprecipitation, nitrosation and chelation were carried out at 25° C. instead of at 40° C., 5.7 grams of dry sodium stearate were added after the sodium nitrite and prior to heating to 95°–97° C., no zinc stearate was added, and the slurry was agitated at 50°–60° C. for 2 hours instead of 4 hours. The product of this example (47.2 grams) contained 12.4% nickel, equivalent to 85% of the nickel chelate. The X-ray diffraction pattern indicated formation of the crystalline, light-stable form of the nickel chelate of 1-nitroso-2-naphthol. The light-fastness of the product of this example was comparable to that of Example 1 of the Putney patent.

EXAMPLE 8

The procedure of Example 1 was repeated except that 8.4 grams of sodium stearate were substituted for the 1.4 grams of the sodium salt of condensed naphthalene sulfonic acid, 30.8 grams of the nickel sulfate hexahydrate were used, the beta-naphthol reprecipitation, nitrosation and chelation were conducted at 25° C. instead of 40° C., no zinc stearate was used and the final slurry was agitated at 50°–60° C. for 2 hours prior to filtration. The dried product was 47.7 grams of a reddish-brown pigmentary material which was easily crushed to a soft powder by hammer-milling. The X-ray diffraction pattern indicated that the product contained the crystalline nickel chelate of 1-nitroso-2-naphthol having strongest d-spacings at about 11.6, 9.6, 6.0, 4.9, 4.5 and 3.6 Angstroms and nickel stearate. When the product was tested on paper drawouts in a Fadeometer according to the procedure of Example 1, the light-fastness was comparable to that of the pigmentary composition of Example 1.

EXAMPLE 9

The procedure recited in the first two paragraphs of Example 1 was repeated, the diluted slurry at 60° C. was filtered and washed free of salts and the resulting filter cake was reslurried in 3000 grams of water at 55° C. Next 19.4 grams of stearic acid (equivalent to 0.5 part per part of anhydrous nickel chelate) were added to the slurry and the mixture was agitated for 4 hours at 50°–55° C., following which the mixture was filtered to remove the solids and the solids were recovered as in Example 1. The dried product was 60.0 grams of a reddish-brown pigmentary composition which was easily crushed to a powder. Analysis for nickel (9.75%) indicated that the product contained about 67% of the nickel chelate of 1-nitroso-2-naphthol and, by difference, about 33% of stearic acid. The X-ray diffraction pattern and light-fastness evaluation confirmed that the product contained the crystalline, light-stable form of the nickel chelate of 1-nitroso-2-naphthol.

What I claim and desire to protect by Letters Patent is:

1. A process for producing a pigmentary composition containing an anhydrous, crystalline, light-stable nickel chelate of 1-nitroso-2-naphthol characterized by having an X-ray diffraction pattern which exhibits strongest d-spacings at about 11.6, 9.6, 6.0, 4.9, 4.5 and 3.6 Angstroms, which process comprises intimately contacting particles of a hydrated nickel chelate of 1-nitroso-2-naphthol in aqueous medium at a pH of about 3.5 to about 5.0 with from about 0.15 to about 2 parts per part by weight of anhydrous nickel chelate, of at least one fatty acid containing at least 12 carbon atoms or a water-insoluble, normally solid salt thereof at a temperature at which the fatty acid or its salt is a liquid, isolating the resulting product from the aqueous medium, and then heating the isolated product at a temperature ranging from about 75° C. to about 115° C. until the product is dehydrated and converted to the anhydrous, crystalline, light-stable form of the nickel chelate.

2. The process of claim 1 wherein the hydrated nickel chelate is in the form of presscake.

3. The process of claim 1 wherein the aqueous medium is the aqueous reaction medium in which the hydrated nickel chelate is formed.

4. The process of claim 3 wherein the salt is a nickel, zinc, aluminum or amine salt containing at least 2 fatty acid residues, or a monoamine salt or quaternary ammonium salt containing one fatty acid residue and at least one long chain alkyl substituent on the nitrogen atom.

5. The process of claim 4 wherein the fatty acid is stearic acid.

6. A pigmentary composition consisting essentially of an anhydrous, crystalline, light-stable nickel chelate of 1-nitroso-2-naphthol characterized by having an X-ray diffraction pattern which exhibits strongest d-spacings at about 11.6, 9.6, 6.0, 4.9, 4.5 and 3.6 Angstroms and, per part of the anhydrous nickel chelate, from about 0.15 to about 2 parts of at least one fatty acid containing at least 12 carbon atoms or a water-insoluble, normally solid salt thereof.

7. The composition of claim 6 wherein the salt is a nickel, zinc, aluminum or amine salt containing at least 2 fatty acid residues, or a monoamine salt or quaternary ammonium salt containing one fatty acid residue and at least one long chain alkyl substituent on the nitrogen atom.

8. The composition of claim 7 wherein the fatty acid is stearic acid.

9. The composition of claim 8 wherein the salt is nickel stearate.

10. The composition of claim 8 wherein the salt is zinc stearate.